United States Patent
Ashizawa et al.

[11] Patent Number: 5,854,529
[45] Date of Patent: Dec. 29, 1998

[54] VIBRATION ACTUATOR

[75] Inventors: Takatoshi Ashizawa, Kawasaki; Isao Sugaya, Yokohama, both of Japan

[73] Assignee: Nikon Corporation, Tokyo, Japan

[21] Appl. No.: 701,673

[22] Filed: Aug. 22, 1996

[30] Foreign Application Priority Data

Aug. 22, 1995 [JP] Japan ................................. 7-213480
May 23, 1996 [JP] Japan ................................. 8-128337

[51] Int. Cl.⁶ .............................. H02N 2/00; H01L 41/08
[52] U.S. Cl. ................................................ 310/323
[58] Field of Search ................................... 310/323

[56] References Cited

U.S. PATENT DOCUMENTS

| | | | |
|---|---|---|---|
| 4,947,076 | 8/1990 | Kumada | 310/323 |
| 4,965,482 | 10/1990 | Ohnishi et al. | 310/323 |
| 5,646,469 | 7/1997 | Tsukimoto et al. | 310/323 |

FOREIGN PATENT DOCUMENTS

| | | | |
|---|---|---|---|
| 0 674 350 | 9/1995 | European Pat. Off. | H01L 41/09 |
| 8-103089 | 4/1996 | Japan | H02N 2/00 |
| 8-140377 | 5/1996 | Japan | 310/323 |
| 8-242593 | 9/1996 | Japan | 310/323 |

OTHER PUBLICATIONS

U.S. application No. 08/580,973, Mitsuhiro Okazaki et al., filed Jan. 3 1996, Nikon Corporation.
U.S. application No. 08/659,828, Takatoshi Ashizawa, filed Jun. 7, 1996, Nikon Corporation.
U.S. application No. 08/685,429, Daisuke Saya, filed Jul. 24, 1996, Nikon Corporation.

*Primary Examiner*—Thomas M. Dougherty

[57] ABSTRACT

A heterodegenerate type of vibration actuator, which during driving, when noise arises, does not suffer from a reduced driving efficiency nor is the driving force reduced. Such a vibration actuator includes a support member, an elastic body which generates a driving force at a driving surface D, which is an end surface located on an outer surface of the support member, a relative motion member that is in compressive contact with the elastic body located so as to rotate freely on the circumference of the mounting member, and a fixed member which fixes the support member and the elastic body. A mounting standard member regulates the positional relationship of the elastic body and the support member.

17 Claims, 15 Drawing Sheets

FIG. 13(A) t=0
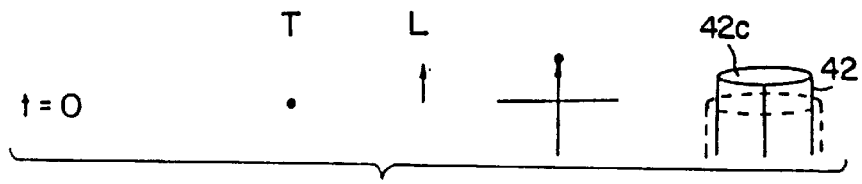
FIG. 13(B) t=(1/4)π
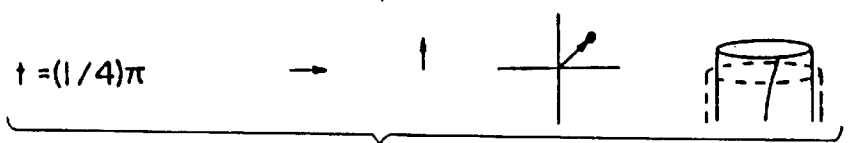
FIG. 13(C) t=(2/4)π
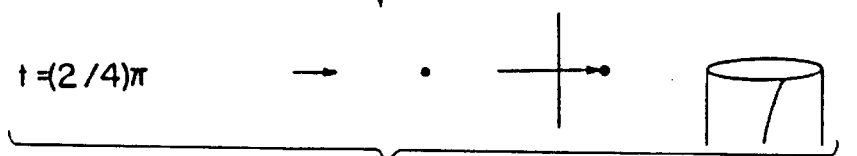
FIG. 13(D) t=(3/4)π
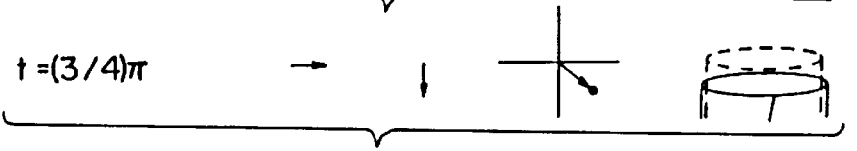
FIG. 13(E) t=(4/4)π
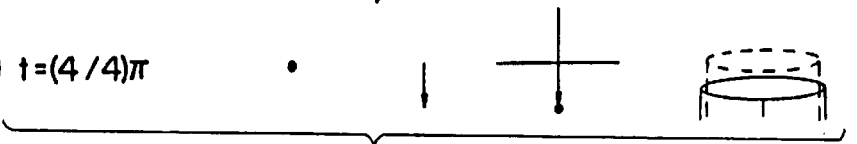
FIG. 13(F) t=(5/4)π
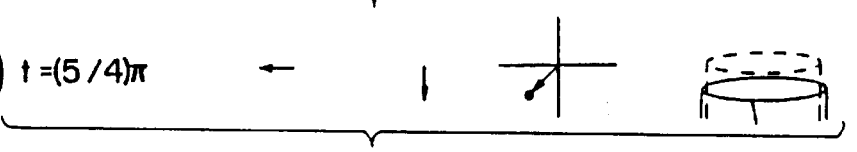
FIG. 13(G) t=(6/4)π
FIG. 13(H) t=(7/4)π

VIBRATION ACTUATOR

CROSS REFERENCE TO RELATED APPLICATIONS

This application is based upon and claims priority from Japanese Patent Application Nos. 07-213480 filed Aug. 22, 1995 and 08-128337 filed May 23, 1996, the contents of each being incorporated herein by reference.

BACKGROUND OF THE INVENTION

1. Field of the Invention

The present invention relates to a heterodegenerate mode of vibration actuator, equipped with an elastic body which gives rise to plural vibration modes, joined to an electromechanical conversion element, with a relative motion member being in compressive contact with the elastic body.

2. Description of the Related Art

FIG. 16 is an oblique diagram showing the structure of a known type of vibration actuator of the longitudinal-torsional vibration type.

In this kind of vibration actuator, a stator (fixed element) 101 includes a piezoelectric element 104 (an electromechanical converting element) for use in torsional vibration, which is located between two circular columnar vibration elements 102, 103. In addition, a piezoelectric element 105 for use in longitudinal vibration is located on the top side of the vibration element 103. The piezoelectric element 104 for use in torsional vibration is polarized in a circumferential direction. On the other hand, the piezoelectric element 105 for use in longitudinal vibration is polarized in the thickness direction. Furthermore, a rotor (elastic body) 106 is located on the top side of the piezoelectric element 105 for use in longitudinal vibration.

The vibrating elements 102, 103 and the piezoelectric element 104, 105 are fixed by threaded engagement with a threaded portion of a shaft 107. The rotor 106 is rotatably disposed on the shaft 107 by ball bearings 108. A nut 110, urged by a spring 109, is screwed to the end of the shaft 107 and causes the rotor 106 to be in compressive contact with the stator 101, with a pressure force F.

The piezoelectric element 104 for use in torsional vibration and the piezoelectric element 105 for use in longitudinal vibration are driven, being controlled by a phase shifter 112, with a constant-frequency voltage being generated by the oscillator 111.

The piezoelectric element 104 for use in torsional vibration confers a mechanical displacement in order to rotate the rotor 106. On the other hand, the piezoelectric element 105 for use in longitudinal vibration, by causing the frictional force acting between the stator 101 and the rotor 106 to periodically change in synchronism with the period of the torsional oscillation due to the piezoelectric element 104, performs a clutch-like function which converts the vibration to a unidirectional motion.

FIG. 17 is an oblique diagram showing an exploded view of the stator 101 of the known vibration actuator described above. The electro-mechanical converting element 104 for torsional vibration, because it is necessary to polarize the electromechanical converting element in the circumferential direction, as shown in the Figure, is divided into six to eight fan-shaped small pieces. After the polarization processing of each small piece, the pieces were again assembled into a ring. Electrode 104a is disposed between the two ring of the electromechanical converting element 104. However, in this kind of vibration actuator, when assembling the electromechanical converting element 104 for torsional vibration in a ring, it is difficult to provide dimensional accuracy.

On the one hand, the respective cross sectional areas of the electromechanical converting element 105 for longitudinal vibration and of the electro-mechanical converting element 104 for torsional vibration were about equal to the cross sectional area of the stator 101, or, smaller than the cross sectional area of the rotor 106. Moreover, it was necessary to open a central hole in the electro-mechanical converting element 105 for longitudinal vibration and in the electro-mechanical converting element 104 for torsional vibration, in order for the shaft 107 to pass through. Because of this, the cross sectional areas of the electro-mechanical converting element 105 for longitudinal vibration and of the electro-mechanical converting element 104 for torsional vibration were further reduced, and it became difficult to design the actuator for high torque and high rotation.

In order to solve such problems, the present assignee has already disclosed, for example in Japanese Patent Application 6-275022, vibration actuators which have high torque and high rotation, and moreover are of simple structure and simple manufacture.

FIG. 18 is a vertical cross section showing a structural example of a heterodegenerate mode type of vibration actuator. FIG. 19 is an oblique diagram showing the elastic body alone, constituting this vibration actuator.

In FIG. 18, a vibrator 2, which is a tubular elastic body, is disposed on the outer circumference of a cylindrical fixed shaft 1. The vibrator 2 is fixed at the approximate center portion 1a of the fixed shaft 1 by threaded mounting bolts 3a, 3b passing therethrough.

The vibrator 2, as shown in FIG. 19, is constituted by two assembled thick semicylindrical tubular elastic bodies 2a, 2b. In their junction surface, there are interposed a total of four layers, two respective ones of torsional piezoelectric elements 4, 4 which have a large piezoelectric constant $d_{15}$, and two of longitudinal piezoelectric elements 5, 5 which have a large piezoelectric constant $d_{31}$.

In FIG. 18 and FIG. 19, a movable element 7, which is a relative motion member, is located by a centrally located bearing 6 for free rotation around the fixed shaft 1, and comes into contact with the drive surface D, which is the upper end surface of the vibrator 2.

The movable element 7 is constituted by the movable element base material 7a and by a sliding member 7b which contacts the drive surface D of the vibrator 2. The bearing 6, which has been fitted into the inner circumference of the movable element base material 7a, is located around the fixed shaft 1. Moreover, the movable element 7 is pressed into contact with the drive surface D of the vibrator 2, with a suitable contact pressure, by a pressure member 8 which is a disc spring (a coil spring or a flat spring may equally well be used).

In this manner, the fixed shaft 1 fixes and supports the vibrator 2 and in addition determines the position of the movable element 7 in the radial direction while leaving it free to rotate, and prevents the generation of axial vibration while operating as a vibration actuator. The fixed shaft 1 has a threaded portion 1b formed at its front end, and in order to regulate the amount of pressure of the pressure member 8, a nut 9 or the like pressure adjusting member is screwed thereon.

In a vibration actuator having such a constitution, by the excitation by impressing respective drive voltages on the piezoelectric elements 4, 5 from a drive voltage generation device (not shown in the drawing), torsional vibrations and longitudinal vibrations are harmonically generated. When the resonance frequencies of the torsional vibrations and the longitudinal vibrations approximately coincide, torsional vibrations and longitudinal vibrations occur simultaneously (degeneracy), and an elliptic vibration is generated at the drive surface D. This elliptic vibration becomes a driving force, and the movable element 7 which is in pressure contact is rotate.

However, from results accumulated by the inventors' further investigations, it was found that this heterodegenerate mode vibration actuator had the following problems. Namely, the vibrator 2, because it makes contact, in approximately the whole region of the inner surface, with the fixed shaft 1, due to the respective processing accuracy and the like of the fixed shaft 1 and the vibrator 2, has portions where the contact pressure on the vibrator 2 becomes high, and portions occur where the contact pressure becomes low.

When driving the vibration actuator in such a state where such uneven contact pressure on the vibrator 2 arises, due to the torsional vibration and longitudinal vibration generated by the vibrator 2, the places within the vibrator 2 where the contact pressure is low interfere with the fixed shaft 1, and anomalies arise.

On the other hand, in order to drive the relative movement member 7 with good efficiency, it is necessary to reduce the vibration losses of the vibrator 2. However, in the vibration actuator shown in FIGS. 18 and 19, in cases in which the vibration losses of the vibrator 2 are increased, because approximately the whole region of interior surface of the vibrator 2 is in contact with the fixed shaft 1, there was a problem that the driving efficiency or driving force of the relative motion member 7 becomes reduced.

Namely, the vibration actuator, exciting the resonant modes of the vibrator, takes this out as a driving force. Because of this, in order to obtain a high efficiency vibration actuator, it becomes necessary to transmit the vibration amplitude generated in the vibrator to the maximum extent possible to the moving element. On the other hand, it is necessary to mount the vibrator on a fixed shaft, because of the loading of the on board image instruments and position setting with respect to the elastic body. This fixed shaft, in the prior art, makes performing position adjustment to the extent necessary in order to accurately perform vibrator position setting by making it necessary to fix the vibrator surface area for vibrator support. Thus, it was necessary to securely fix the vibrator by bolts and the like.

However, when fixing the vibrator by bolts and the like, for example, even though this fixed position is close to the nodes of plural vibrations excited in the vibrator, because a large fixed surface is used and in addition a high rigidity fixing method, the energy dissipation (energy loss) of each vibration generated in the vibrator is great. In other words, the support losses of the vibrator, could not be avoided.

In order to decrease or reduce such support losses, in the prior art, with the object of making the fixing surface small, causing a decrease in the rigidity of the support member, coupling and fixing the vibrator and the support shaft by pins, without bolts, could be equally investigated.

FIG. 20 ia an enlarged cross sectional view showing the fixed configuration of a vibrator 2 and fixed shaft 1. A pin 3c is used as a support member. By using the pin 3c, the fixing surface of the vibrator 2 is reduced. In addition, a reduction is caused in the rigidity of the support member, and the design is such that the support losses of the vibrator 2 are reduced.

As shown in FIG. 20, by using the pin 3c as a support member, it is possible to certainly reduce the support losses.

However, in this case, because the fixing area between the vibrator and the fixed shaft 1 is reduced, vibration of the vibrator results with respect to the fixed shaft 1 accompanying the driving of the vibration actuator. Because of this, in order to reliably set the location of the vibrator 2 with respect to the fixed shaft, in a gap between the vibrator 2 and the fixed shaft 1, it was necessary to install annular collars A1, A2 and the like special members.

Moreover, as shown in FIG. 20, even if collars A1, A2 are used in the gap between the vibrator 2 and the fixed shaft 1, the effect was that it was very difficult to reliably set the position of the vibrator and the fixed shaft, because an exact interval was necessary to perform fitting of the collars A1, A2 between the inner circumferential surface of the vibrator and the outer circumferential surface of the fixed shaft.

Furthermore, heretofore, in the case of assembling a vibration actuator as part of a built-in image instrumentation, the vibration of the vibrator is propagated via the fixed shaft, and it was a problem that other components placed close to this vibration actuator (other sensors and the like) are adversely affected.

In such cases, the driving frequency of the vibration actuator came to be set outside the undesirable frequency bands which were used by the other components. However, this severely curtailed the freedom of design of the vibration actuator.

Moreover, as a special countermeasure, making the space between the vibration actuator and the other components as large as possible, or disposing vibration preventing material in the vicinity of the vibration actuator in order for vibration insulation, were considered. However, these gave rise to various restrictive requirements on the design of the vibration actuator or the built-in image instrumentation, and freedom of design was markedly lost.

SUMMARY OF THE INVENTION

The present invention, in the heterodegenerate mode type of vibration actuator, includes a vibrator that is not in contact over its whole interior circumferential surface with the fixed shaft, but is constituted such that a portion of it makes contact with the fixed shaft, so that it is possible to solve the above problems.

Objects of the present invention are achieved by using a vibration actuator, comprising a rod shaped support member having an exterior surface, an elastic body having an inner circumferential surface and being located on the exterior surface of the support member and which supports an electro-mechanical energy conversion element to convert electrical energy into mechanical energy and being excited by a drive signal, the electro-mechanical energy conversion element generating a drive force in a drive surface which is an end surface of the elastic body, a relative motion member, disposed to be freely rotatable around the support member and compressively contacting the elastic body at the drive surface, and a fixed member which penetrates the support member and the elastic member, and which fixes the support member and the elastic body, wherein a portion of the inner circumferential surface of the elastic body includes a mounting standard unit disposed to regulate the positional relationship of the elastic body and the support member.

Further objects are achieved by a vibration actuator, wherein the support member, in relation to an axial direction, comprises a contact portion which comes into contact with the mounting standard unit, and a non-contact portion which is separated from the inner circumferential surface of the elastic body excluding the mounting standard unit.

Additional objects are achieved by using a vibration actuator, wherein the contact portion is a large diameter portion, and the non-contact portion is a small diameter portion.

Yet further objects of the present invention are achieved by a vibration actuator, wherein the contact portion is formed to fit a portion of the internal surface of the elastic member.

Still further objects of the present invention are achieved by a vibration actuator, wherein the contact portion is disposed in a position which contacts a nodal portion of a torsional vibration or of a longitudinal vibration of the elastic body.

Additional objects are achieved by using a vibration actuator, wherein on a portion of the contact portion a non-contact portion is formed which does not contact the mounting standard unit.

Yet further objects of the present invention are achieved by a vibration actuator, wherein the non-contact portion is formed by a counterbore hole disposed in the contact portion.

Moreover, further objects of the present invention are achieved by a vibration actuator, wherein in the elastic body, an abutment member is disposed which causes the contact portion of the support member to come into contact towards the mounting standard unit of the elastic body.

Furthermore, additional objects of the present invention are achieved by a vibration actuator, wherein the abutment member is the fixed member.

Additional objects of the present invention are achieved by a vibration actuator, wherein the abutment member is fixed in the contact portion of the support member.

Yet further objects of the present invention are achieved by a vibration actuator, wherein the abutment member perforates the non-contact portion of the contact portion.

Additional objects and advantages of the invention will be set forth in part in the description which follows and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 4(A) is a top view, and FIG. 4(B) is a front view;

FIG. 10(A) is a side view of a cross section halved at the center line, and FIG. 10(B) is an illustrative diagram showing cross sections A—A, B—B and C—C of FIG. 10(A), and also the situation of impressed drive voltage;

FIGS. 13(A)–13(H) are illustrative diagrams showing, in a timing chart of an ultrasonic actuator according to the third embodiment, the first order longitudinal vibration and second order torsional vibration arising in the vibrator and their combination at the drive surface D to impart an elliptic motion;

DESCRIPTION OF THE PREFERRED EMBODIMENTS

Preferred embodiments of the present invention are described in detail hereinbelow, with reference to the accompanying drawings. Moreover, the description of each embodiment hereafter, takes as an example an ultrasonic actuator, which uses an ultrasonic driving region, acting as a vibration actuator.

Figure 1:
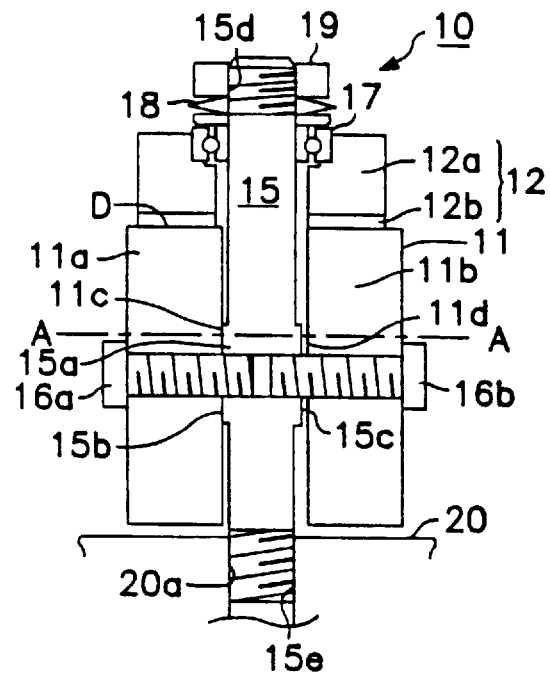
FIG. 1. is a cross sectional diagram which illustrates an ultrasonic actuator according to a first preferred embodiment of the present invention.
Figure 2:
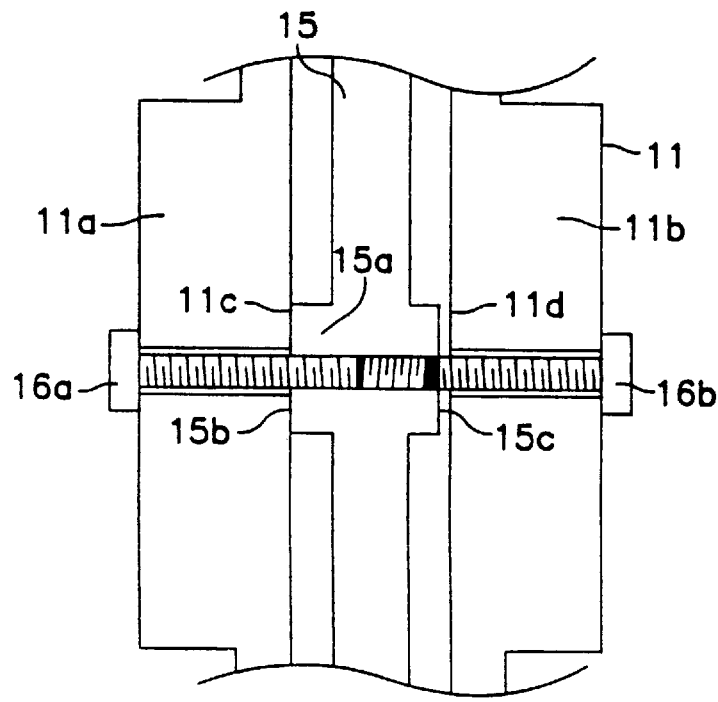
FIG. 2 is a longitudinal sectional diagram showing an enlargement of the fixing portion of the vibrator and the fixed shaft in FIG. 1.
Figure 3:
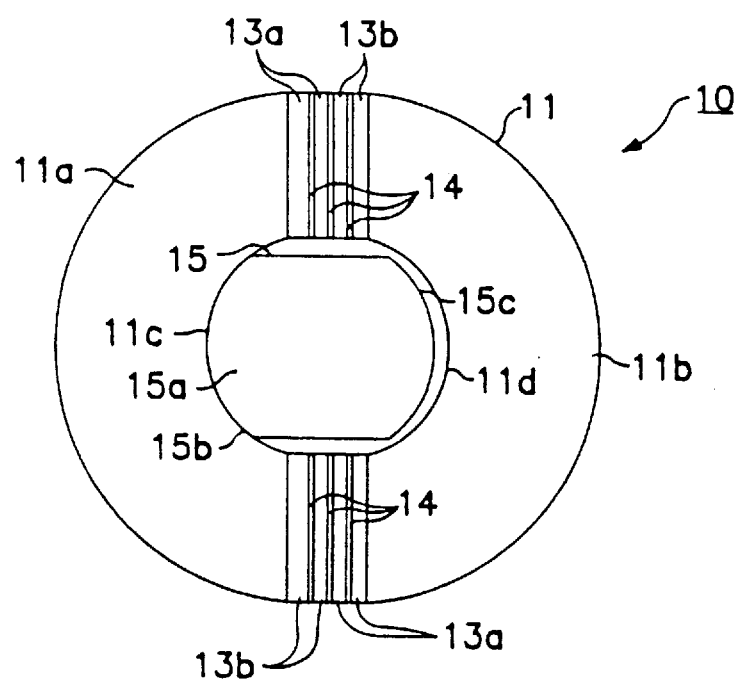
FIG. 3 is a cross section A—A of FIG. 1.
Figure 4A:
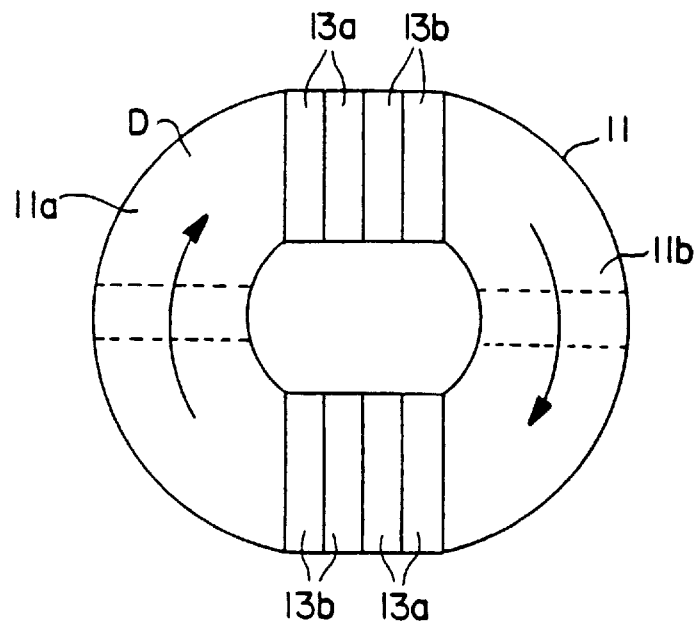
FIGS. 4(A) and 4(B) are illustrative diagrams showing the vibrator used in the ultrasonic actuator of the first embodiment of the present invention, where
Figure 4B:
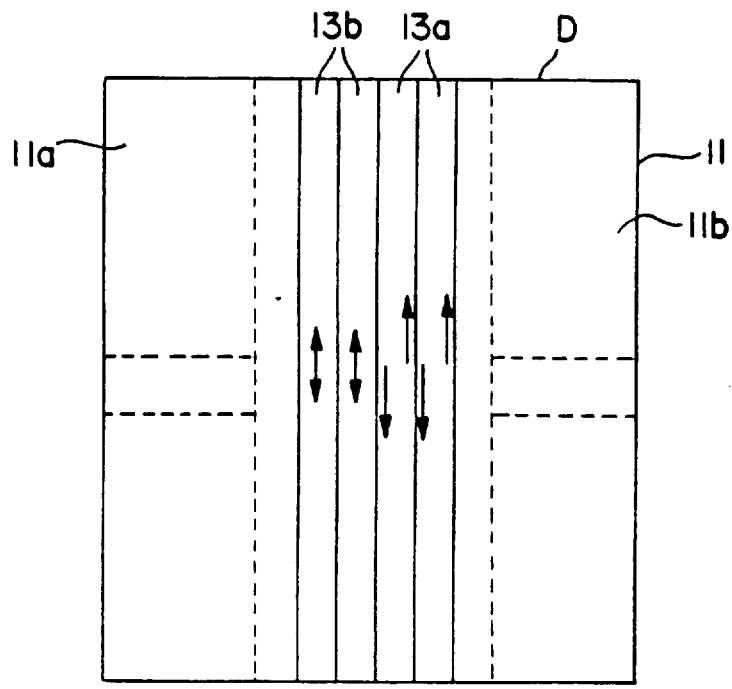

FIG. 1 is a cross sectional diagram which illustrates an ultrasonic actuator according to a first preferred embodiment of the present invention. FIG. 2 is an enlarged longitudinal section showing the fixing portion of the vibrator 11 and fixed shaft 15 in FIG. 1. Moreover, FIG. 3 is a cross section A—A of FIG. 1. Furthermore, FIGS. 4(A) and 4(B) are illustrative diagrams showing the structure of a vibrator used in this vibration actuator. FIG. 4(A) is a top view, and FIG. 4(B) is a front view.

The ultrasonic actuator 10 according to the first preferred embodiment is equipped with a vibrator 11 which is a cylindrical elastic body, and a moving element 12, which is a relative moving member of the cylinder and comes into compressive contact with the driving surface D, which is the end surface of the vibrator 11.

The vibrator 11 is constituted by two semicylindrical tubular elastic bodies 11a, 11b. Interposed between them are two pairs of, for a total of four, piezoelectric elements 13a for use in torsional vibration, which have a large piezoelectric constant $d_{15}$, and which execute shearing displacement in the length direction of the vibrator 11, and two pairs of, for a total of four, piezoelectric elements 13b for use in longitudinal vibration, which have a large piezoelectric constant $d_{31}$, which expand and contract in the length direction of the vibrator 11. Vibrator 11 also includes respective electrodes 14 connected to each piezoelectric element 13a, 13b.

The semicylindrical tubular elastic bodies 11a, 11b are made of an elastic material such as stainless steel (a ferrous alloy, or copper alloy, or the like metals, or plastics and the like may also be used). To manufacture elastic bodies 11a and 11b, thick walled cylindrical tubular bodies including these materials are divided in two along a plane which includes their axis of rotation.

The piezoelectric elements 13a, 13b, are electromechanical energy conversion elements which convert any electrical energy into mechanical displacement (mechanical energy), and are formed in thin rectangular plates of PZT (lead zirconia titanate) and the like. Moreover, the electrodes 14 exhibit the same plate configuration as the piezoelectric elements 13a, 13b. Copper electrodes are used in this embodiment.

In the vibrator 11, the piezoelectric elements 13a, 13b and the electrodes 14 are mutually laminated as shown in FIGS. 3 and 4. In addition, the piezoelectric elements 13a, 13b and the electrodes 14 are interposed between the semicylindrical tubular elastic bodies 11a, 11b, and assembled by respective adhesion.

The moving element 12 principally includes a moving element base material 12a made of aluminum and the like light alloy or stainless steel. In between the end surfaces of the moving element 12a and the vibrator end surface D, sliding materials 12b are affixed to moving element 12a in order to reduce the sliding resistance of the vibrator 11.

The fixed shaft 15, which is a rod-shaped support member, is inserted into the hollow portion in the central portion of the vibrator 11. This fixed shaft 15 is made of stainless steel (copper alloy, aluminum alloy or plastic, and the like may also be used).

At the approximate center of the fixed shaft 15, a large diameter cross sectional form portion 15a is provided, as shown in FIG. 2. Among the two circular arcuate side surfaces 15b, 15c of this large diameter portion 15a, a circular arcuate portion 15b positioned on the left-hand side of the drawing, contacts and presses upon a mounting standard unit 11c of a cylindrical shape of the same radius of curvature disposed in the inner circumferential surface of the semicylindrical tubular elastic body 11a. Namely, this circular arcuate side surface 15b is an abutment member which makes contact with the mounting standard unit 11c.

Then the elastic body 11 is fixed to the fixed shaft 15, via the circular arcuate side surface 15b and the mounting standard unit 11c which are pressed against each other, by bolts 16a, 16b, which are fixing members threaded into the semicylindrical tubular elastic bodies 11a, 11b.

These bolts 16a, 16b also function as contact members which cause the circular arcuate side surface 15b of the fixed shaft 15 to contact towards the mounting standard unit 11c of the elastic body 11.

In this embodiment, if yet another circular arcuate side surface 15c is not in contact with the inner circumferential surface 11d of the semicylindrical tubular elastic body 11b, contact is made only with the mounting standard unit 11c, and the fixed shaft 15 is located in an eccentric state with respect to the hollow portion of the vibrator 11. The moving element 12, which is a relative motion member, makes contact with and is arranged to rotate freely on the fixed shaft 15 by the bearing 17 located at the center portion. The moving element 12 is pressed into contact with a suitable contact pressure onto the driving surface D of the vibrator 11 by a disc spring 18 which is a pressure member (a coil spring or flat spring may equally well be used).

In this manner, the fixed shaft 15 fixes the vibrator 11 and in addition sets the position of the moving element 12 in free rotation in the radial direction, and prevents axial vibration occurring during driving of the vibration actuator. A threaded portion 15d is formed at the end of this fixed shaft 15, and a nut or the like pressure adjustment member 19 is screwed thereon in order to adjust the amount of pressure of the pressure member 18. A screw threaded portion 15e is cut into the other end of the fixed shaft 15, and the internal portion 20a of a fixed body 20 is in threaded engagement therewith.

In this manner, only the mounting standard unit 11c of the vibrator 11 is in contact with the fixed shaft 15. The other portions of the vibrator 11 are not in contact with the fixed shaft 15, and the contact surface area (fixed surface area) between the vibrator 11 and the fixed shaft 15 is greatly reduced. Because of this, the vibration losses of the vibrator 11 are markedly reduced from those of the prior art, and the driving efficiency and driving force of the vibrator 12 are increased.

Moreover, because the contact surface area between the vibrator 11 and the fixed shaft 15 is greatly reduced, the contact pressure of the contact unit is made uniform. Due to this, the occurrence of small sounds and the like anomalies during ultrasonic actuator driving is suppressed.

Moreover, the radius of curvature of the circular arcuate side surface 15b of the large diameter portion 15a is made to agree with the radius of curvature of the inner surface of the vibrator 11. In addition, because the fixed shaft 15 is caused to be eccentric in the vibrator 11, in comparison with cases having no eccentricity, the contact surface area can be further reduced, and a greater effect can be obtained.

Figure 18:
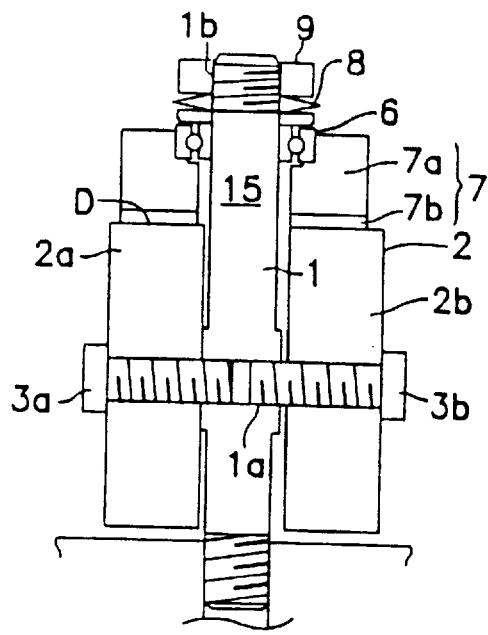
FIG. 18 is a cross sectional diagram showing the structure of a known heterodegenerate mode type of vibration actuator.
Figure 19:
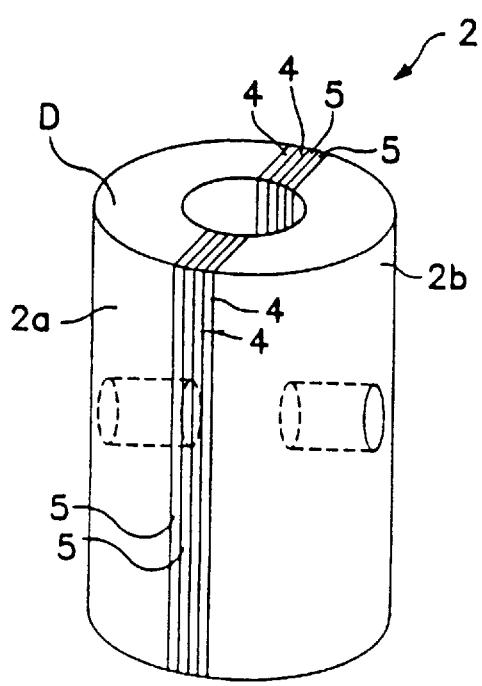
FIG. 19 is an oblique diagram showing the elastic body separately which constitutes the structure of a known heterodegenerate mode type of vibration actuator.
Figure 20:
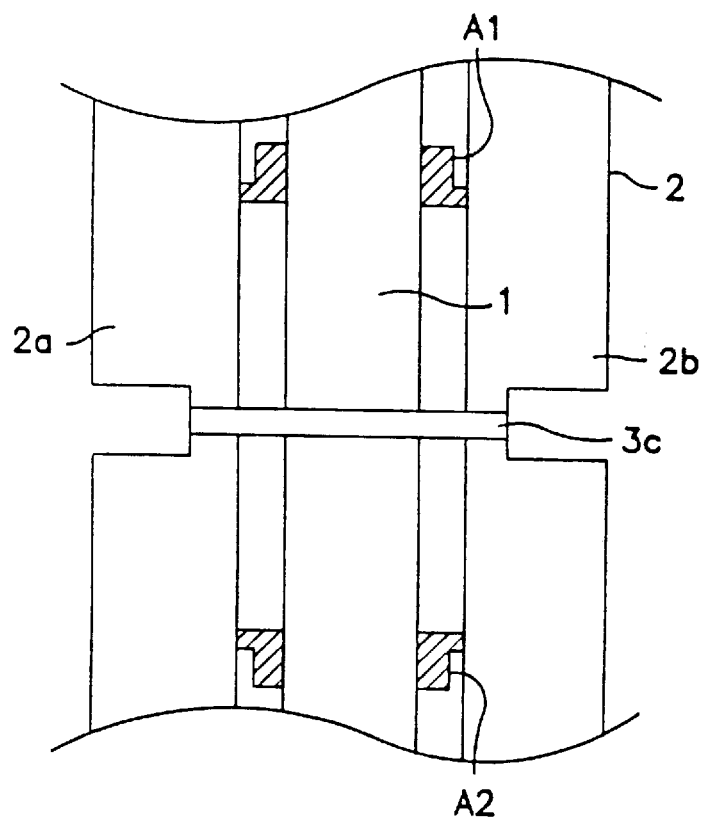
FIG. 20 is an illustrative diagram showing a prior art method of fixing the shaft to the elastic body.

Furthermore, in the structure shown in FIG. 18, after the vibrator 2 and the piezoelectric elements 4, 5 have been joined, such that the internal diameter of the elastic body 2 and the external diameter of the fixed shaft 1 agree, it was necessary to perform mechanical processing (grinding and the like) of the outer surface of the fixed shaft 1, but because in the first preferred embodiment the fixed shaft is fixed and caused to be eccentric in the hollow portion of the vibrator 11, in other words, because a fixed shaft 15 is used of smaller external diameter than the internal diameter of the hollow portion of the vibrator 11, there is no necessity to perform this kind of mechanical processing on the fixed shaft 15.

Figure 5:
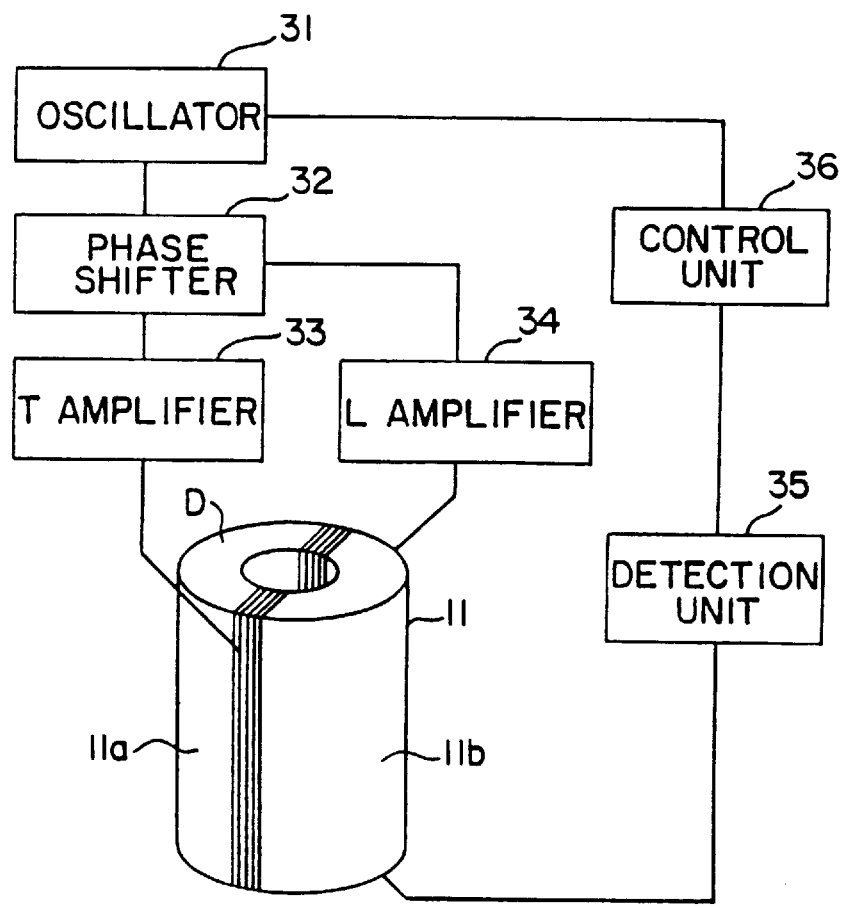
FIG. 5 is a block diagram which shows the drive circuit of the ultrasonic actuator of the first embodiment of the present invention.
Figure 6:
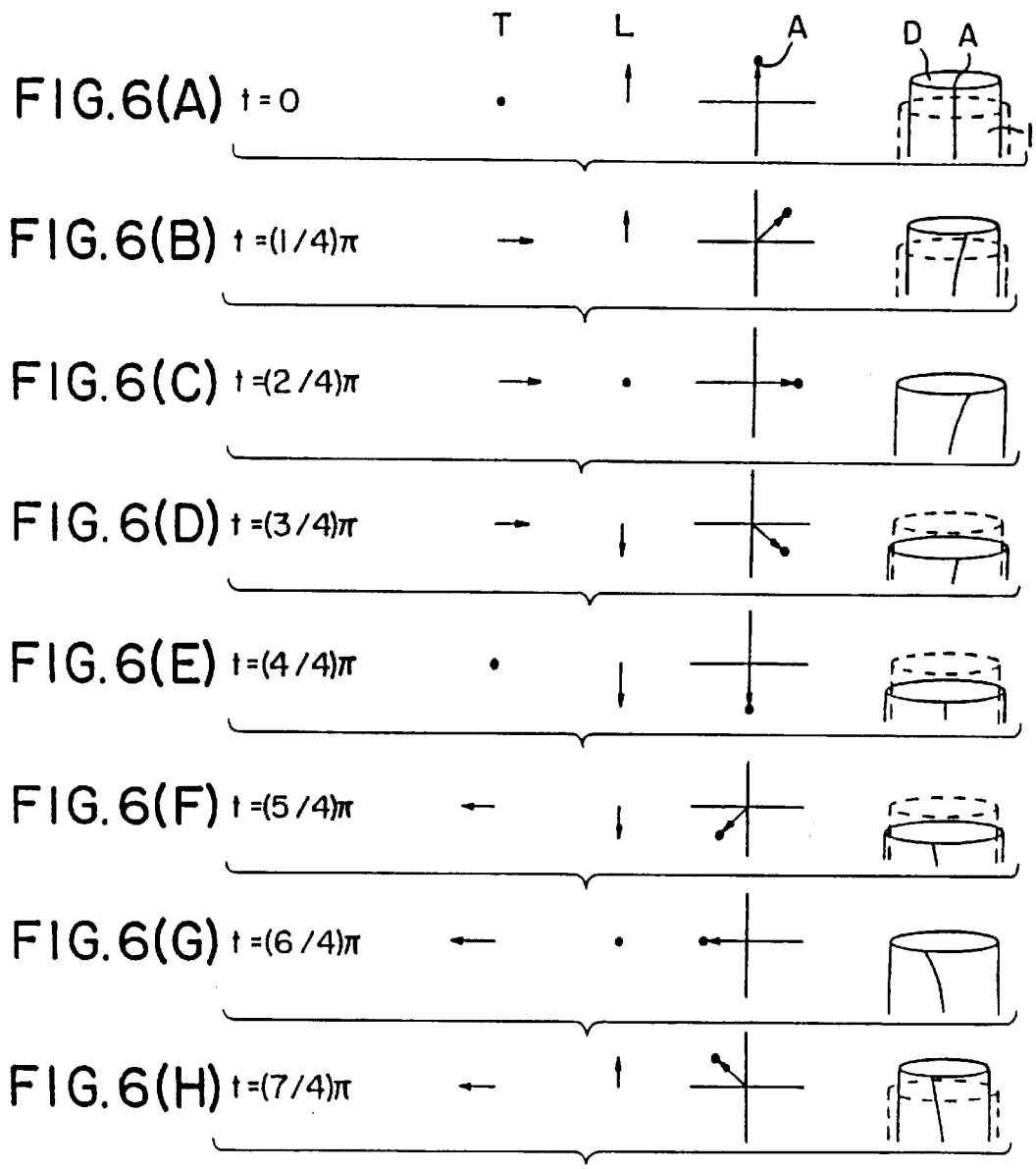
FIGS. 6(A)–6(H) are illustrative diagrams showing the changes with time as a first order longitudinal vibration and a first order torsional vibration, which arise in the vibrator, combine to give rise to an elliptic motion in the drive surface in an ultrasonic actuator according to the first embodiment.

FIG. 5 is a block diagram showing a drive circuit of a vibration actuator 10 of the first embodiment. The drive circuit is formed from an oscillator 31 which generates a drive signal, a phase shifter 32 which divides this drive signal into signals with a phase difference of (1/4) λ (λ=wavelength), a T amplifier 33 which amplifies the drive signal input to the piezoelectric element 13a for use in torsional vibration, and an L amplifier 34 which amplifies the drive signal input to a piezoelectric element 13b for use in longitudinal vibration.

The control circuit is constituted by a detection unit 35 which detects torsional vibration, and a control unit 36 which controls the frequency or voltage, etc., of the oscillator according to the detection quantity of the detection unit 35. The detection unit 35 is equipped with a mechanoelectric energy converting element (not shown in the drawing) which is affixed to the bottom face, opposite the driving surface D of the vibration element 11, and which, by detecting the voltage which arises in the mechano-electric converting element accompanying the torsional vibration, can indirectly detect torsional deformation which arises in the vibration element 11. In this manner, the detection element 35 detects the torsional vibration of the vibrator 11 by using a voltage. The drive speed or drive torque of the moving element 12 is estimated based on this voltage.

The control unit 36 controls the drive frequency or voltage of the vibrator 11 by the detection result of the detection unit 35. For example, in the case that the detection amount is greater than a predetermined value, the drive frequency is made high, and the voltage decreases. On the other hand, if the detection amount is smaller than the predetermined value, the drive frequency is made low, and the voltage increases.

Next, with reference to FIGS. 6(A)–6(H), in an ultrasonic actuator 10 according to this embodiment, combining a first order longitudinal vibration and a first order torsional vibration arising in the vibrator 11, the changes with time which give rise to an elliptic motion in the drive surface D will be described.

As shown in FIG. 6(B), when the phase difference of the period of the torsional vibration and the period of the longitudinal vibration is made (1/4) λ (λ=wavelength), an elliptic motion arises at a fixed point on the driving surface D.

At the time point t=(6/4) π in FIG. 6(G), the displacement of the torsional vibration T is a maximum to the left-hand side, and on the other hand the longitudinal vibration L is zero. In this state, the moving element 12 is in compressive contact with the driving surface D of the vibrator 11 due to the pressure member 18.

From this state, during t=(7/4) π (FIG. 6(H))–0 (FIG. 6(A))–(2/4) π (FIG. 6(C)), the torsional vibration T changes from a left-hand side maximum to a right-hand side maximum, and on the other hand, the longitudinal vibration L changes from zero to a maximum at the upper side and returns to zero. Accordingly, the fixed point of the driving surface D of the vibrator 11 rotates in the right-hand direction while pushing the moving element 12, and drives the moving element 12.

Next, during t=(2/4) π (FIG. 6(C))–(6/4) π (FIG. 6(G)), the torsional vibration T changes from a maximum on the right-hand side to a maximum on the left-hand side, and on the other hand, the longitudinal vibration L changes from zero to a maximum on the lower side, and returns to zero. Accordingly, the fixed point of the driving surface D of the vibrator 11, because the rotation in a left-hand direction is separated from the moving element 12, does not drive the moving element 12. At this time, the moving element 12, because the characteristic frequency differs, even though pressed by the pressure member 18, does not follow the contraction of the vibrator 11.

Moreover, when the frequency $T_1$ of the torsional vibration T is caused to approximately agree with the resonant frequency $\omega_{OT}$ of the torsional vibration T, and in addition the frequency $L_1$ of the longitudinal vibration is caused to approximately agree with the resonant frequency $\omega_{OL}$ of the longitudinal vibration, the resonating elliptic motion enlarges.

The resonant frequency $\omega_{OT}$ of the torsional vibration and the resonant frequency $\omega_{OL}$ of the longitudinal vibration are given by the following equations (1) and (2):

$$\text{torsional vibration} = Ls \times (G/\rho)^2 \tag{1}$$

$$\text{longitudinal vibration} = Ls \times (E/\rho)^2 \tag{2}$$

where Ls=length of the vibrator in the length direction, E=longitudinal elastic modulus, G=transverse elastic modulus, and ρ=density.

In this manner, by using equations (1) and (2), by adjustment of the length in the length direction of the vibrator 11, the resonant frequency $\omega_{OT}$ of the torsional vibration T, and the resonant frequency $\omega_{OL}$ of the longitudinal vibration can be adjusted into close agreement.

Figure 7:
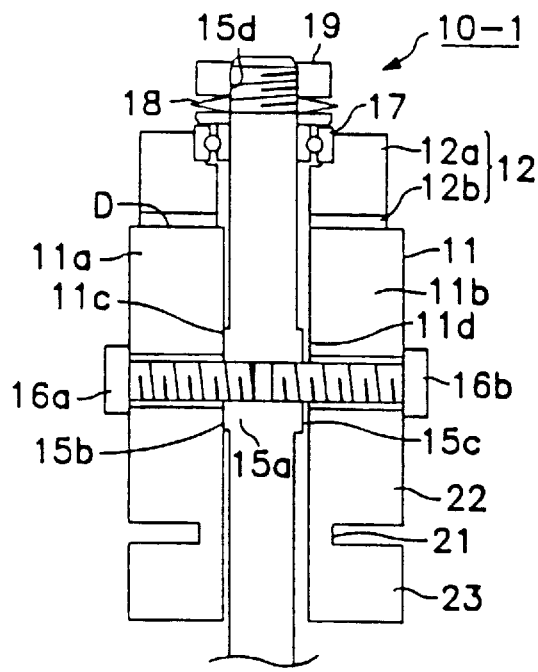
FIG. 7 is a cross sectional diagram which illustrates an ultrasonic actuator according to a second preferred embodiment of the present invention.

FIG. 7 is a cross sectional diagram showing the structure of a vibration actuator according to a second preferred embodiment of the present invention.

Moreover, in the description of each subsequent mode of embodiment, only portions which differ from the first embodiment will be described, with common portions being given the same reference numbers, and duplicate descriptions being omitted.

In the vibration actuator 10-1 of this embodiment, a groove is formed in the lower portion of the vibrator 11 to form a small diameter portion 21, a first large diameter portion 22 and a second large diameter portion 23 are located adjacent to this small diameter portion 21.

The small diameter portion 21, in the former elastic body base material which is divided in two, is formed, for example, by suitable processes such as grinding and the like.

Figures 8A, 8B:
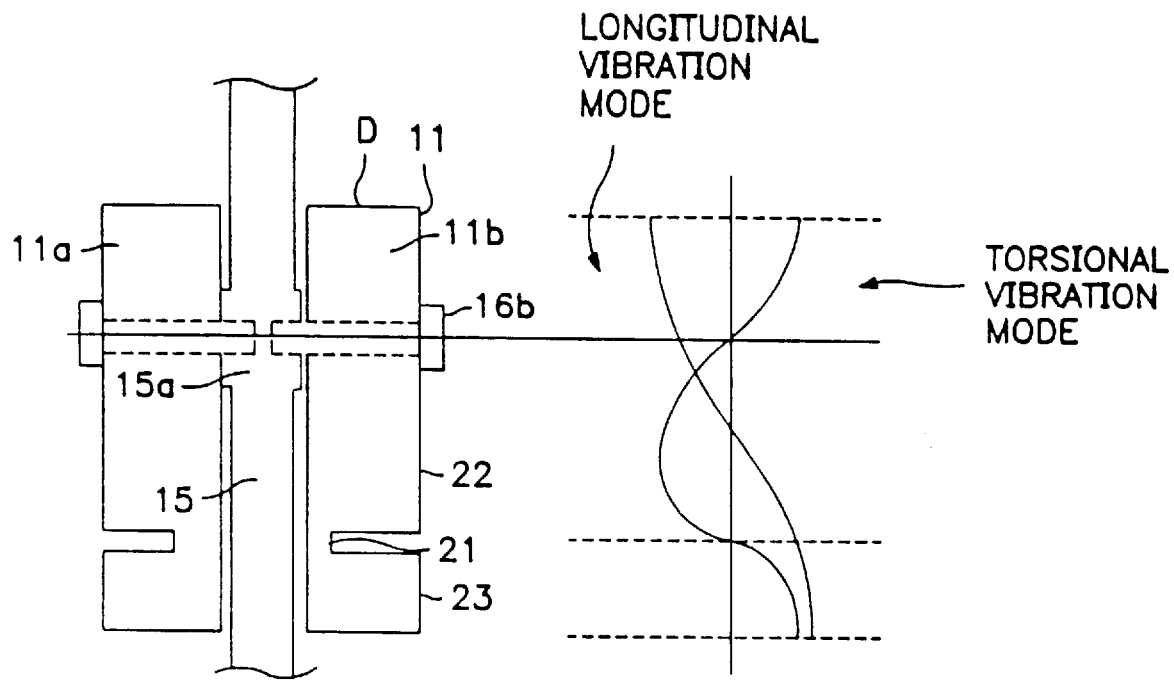
FIGS. 8(A) and 8(B) are illustrative diagrams showing a first order longitudinal vibration and a second order torsional vibration arising in the elastic body in the vibration actuator according to second embodiment.

FIGS. 8(A)–8(B) are illustrative diagrams showing the first order longitudinal vibration and second order torsional vibration which arise in the elastic body 11 of an ultrasonic actuator of this embodiment.

In the vibration actuator of the present embodiment, as shown in FIG. 8(A), the small diameter portion 21, which has a low torsional rigidity, is disposed between the first large diameter portion 22 and the second large diameter portion 23. Also, the length of the first large diameter portion is greater than the length of the second large diameter portion. Accordingly, as shown in FIG. 8(B), two nodes of vibration arise approximately in the middle of the length of the small diameter portion 21 and the first large diameter portion 22, and the vibration becomes a second order mode.

On the other hand, because the longitudinal vibration is only slightly affected by the small diameter portion 21, one node of the vibration arises in the middle of the length comprising the small diameter portion 21, the first large diameter portion 22, and the second large diameter portion 23, and it becomes a first order mode. Moreover, in this case, the driving surface D becomes an antinode of large amplitude of both the torsional vibration and the longitudinal vibration.

The characteristic frequency of the torsional vibration is set by the total length of the small diameter portion 21, the first large diameter portion 22, and the second large diameter portion 23. Among these, it can be said that the effect of length of the second large diameter portion 23 is critical. On the other hand, the characteristic frequency of the longitudinal vibration is also set by the total length of the small diameter portion 21, the first large diameter portion 22, and the second large diameter portion 23, but when the length of the second large diameter portion 23 is changed, the characteristic frequency can be caused to change. Accordingly, by changing the length of the second large diameter portion 23, the respective characteristic frequencies of the torsional vibration and the longitudinal vibration are also adjusted, and these frequencies can be caused to be close or to coincide.

Moreover, this embodiment was made such that the vibrator 11 is supported at the nodal position of the torsional vibration, but because the torsional vibration, as previously mentioned, greatly affects the driving force of the vibration actuator, it is such as to attenuate this vibration as little as possible. This can also be similarly applied to the first embodiment.

Figure 9:
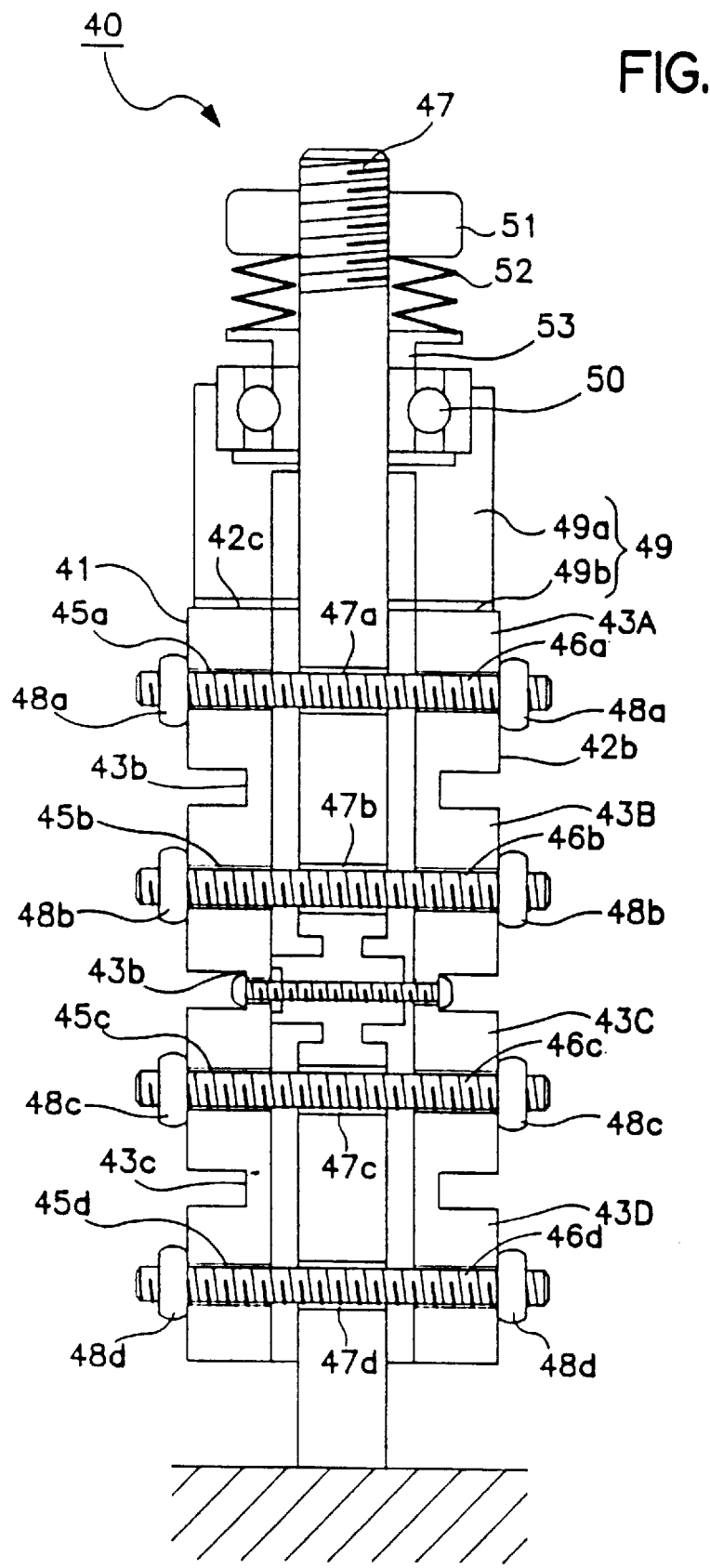
FIG. 9 is a cross sectional diagram which illustrates an ultrasonic actuator according to a third preferred embodiment of the present invention.

FIG. 9 is a longitudinal sectional diagram showing the constitution of an ultrasonic actuator 40 according to a third preferred embodiment of the present invention.

This embodiment, in outline, is a further development of the first and second embodiments. By further reducing the contact surface area of the vibrator and the fixed shaft, while accurately performing positioning of the vibrator and the fixed shaft, the dissipation of the energy of the vibrator is further reduced.

Figure 10A:
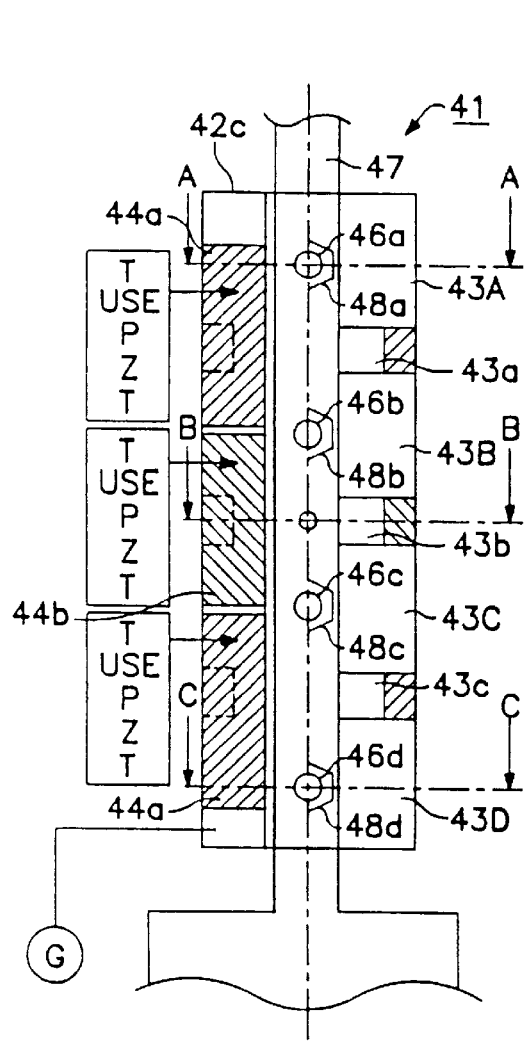
FIGS. 10(A) and 10(B) are illustrative diagrams showing the constitution of a vibrator used in the third embodiment, where
Figure 10B:
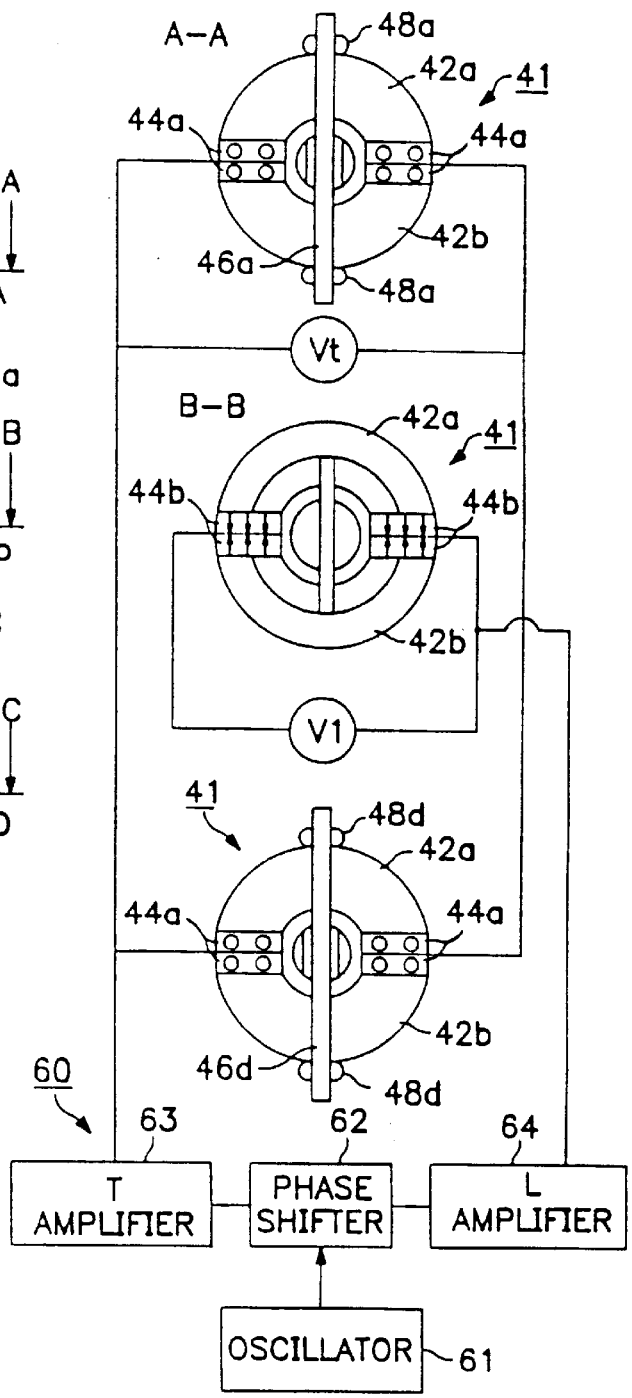

The vibrator 41 includes plural piezoelectric elements which are electro-mechanical conversion elements (not shown in FIG. 9). The arrangement of the piezoelectric elements and the like is described with reference to FIGS. 10(A)–10(C), showing a cross section 90° different from FIG. 9. The piezoelectric elements are excited by drive signal(s). The piezoelectric elements are joined. By the excitation of the piezoelectric elements, by a first order longitudinal vibration and a second order torsional vibration arising, the driving force arising in the drive surface 42c (FIG. 9) is constituted from the elastic bodies 42a, 42b.

The elastic bodies 42a, 42b, as shown in FIG. 9, have grooves formed in their outer circumferential surfaces to give three small diameter portions 43a, 43b, 43c. The elastic bodies are partitioned off by the small diameter portions 43a–43c, four large diameter portions 43A, 43B, 43C, 43D are formed by the placement of the three small diameter portions 43a–43c.

The elastic bodies 42a, 42b, obtained by dividing the hollow cylindrical columnar elastic member into two in a longitudinal plane containing the central axis, have the aforementioned piezoelectric elements interposed between two planes of division.

FIGS. 10(A)–10(B) are illustrative diagrams of the constitution of the vibrator 41 used in this embodiment, where FIG. 10(A) is a side view showing the half sections along the central line, and FIG. 10(B) being an illustrative diagram showing cross sections A—A, B—B and C—C in FIG. 10(A), and the state of affairs of a impressing drive voltage.

As shown in FIGS. 10(A) and 10(B), the piezoelectric elements 44a, 44b include three groups relating to the axial direction of the vibrator. Each group of the piezoelectric elements 44a, 44b comprises two layers. A piezoelectric element of one group among the three groups, a piezoelectric element 44b using a piezoelectric constant $d_{31}$, is arranged close to the node of a first order longitudinal vibration. The remaining two groups of piezoelectric elements, piezoelectric elements 44a using a piezoelectric constant $d_{15}$, are arranged close to the nodes of respective second order torsional vibrations.

The piezoelectric elements 44a which use the piezoelectric constant $d_{15}$ generate shearing displacements with respect to the length direction of the elastic bodies 42a, 42b. The piezoelectric elements 44a are arranged, as shown in the cross sections A—A and C—C of FIG. 10(B), with the respective directions of the torsional vibration becoming opposite. When the piezoelectric elements 44a generate respective shearing deformations in this manner, a second order torsional vibration of the vibrator 41 arises.

The latter piezoelectric elements 44b using a piezoelectric constant $d_{3l}$ generate expansion and contraction displacements with respect to the length direction of the elastic bodies 42a, 42b. In the cross section B—B of FIG. 10(B), two sets of longitudinal vibration use piezoelectric elements 44b. In the case that the entire electrical potential rises, the piezoelectric elements 44b are arranged such that the displacements arise in the same direction.

In the above manner, when the piezoelectric elements 44a for torsional vibration use, using the piezoelectric constant $d_{15}$, and the piezoelectric elements 44b for longitudinal vibration use, using the piezoelectric constant $d_{31}$, are arranged as depicted in the Figure, by inputting a sine wave potential to the piezoelectric elements 44a for torsional vibration use, corresponding torsional motions arise in the vibrator 41. On the other hand, on inputting a sine wave potential to the piezoelectric elements 44b for longitudinal vibration use, expansion and contraction motions arise in the vibrator 41.

In the elastic bodies 42a, 42b, approximately in the center of the length direction of four elastic bodies 43A–43D of large diameter, through holes 45a, 45b, 45c, 45d are disposed, parallel to the piezoelectric element lamination direction. Moreover, through holes 47a–47d are also formed, at the same pitch as the through holes 45a–45d, in the fixed shaft 47.

Then, such as to be the state shown in FIGS. 10(A)–10(B), the piezoelectric elements 44a, 44b are interposed in the plane of division of the elastic bodies 42a, 42b, bolts 46a–46d are inserted in the through holes 45a–45d, 47a–47d and are caused to pass through the fixed shaft 47 in the hollow portion of the elastic bodies 42a, 42b. By screwing nuts 48a–48d onto both ends, the elastic bodies 42a, 42b secure the piezoelectric elements 44a, 44b in the interposed state.

In this embodiment, the elastic bodies 42a, 42b, as shown in FIG. 9, are fixed to the fixed shaft 47 via the inner circumferential surface of the small diameter portion 43b which is in the vicinity of the node of the first order longitudinal vibration. The structure of this portion will be described in detail, with reference to FIG. 11 below.

In FIG. 9, the moving element 49 is constituted by a hollow, thick walled, tubular, movement element base material 49a, and a sliding member 49b which contacts the driving surface 42c of the vibrator 41 affixed to the vibrator side end surface of the moving element base material 49a. A bearing 50, which is a position setting means, is fitted in the inner circumferential portion of the opposite side end surface of the moving element base material 49a. By fixing this bearing 50 to the fixed shaft 47, the moving element 49 is set in position for free rotation with respect to the fixed shaft 47.

A threaded portion is disposed at the upper end portion of the fixed shaft 47, and a nut 51, which is a pressing force adjustment member, is in threaded engagement with this threaded portion. Moreover, a flat spring 52 (a coil spring or a plate spring may equally be used), and a pressure transmission member 53, which is an externally flanged annular body which transmits the pressing force of the flat spring 52 to the bearing 50, are supported by the fixed shaft 47 between the bearing 50 and the nut 51. By this structure, by changing the screw position of the nut 51 with respect to the fixed shaft 47, and changing the spring force of the flat spring 52, the pressing force between the moving element 49 and the vibrator 41 is adjusted.

In this manner, the fixed shaft 47, passing through the hollow portion of the vibrator 41, fixes the vibrator 41, and in addition positions the moving element 49 in the radial direction, for free rotation.

Figure 11:
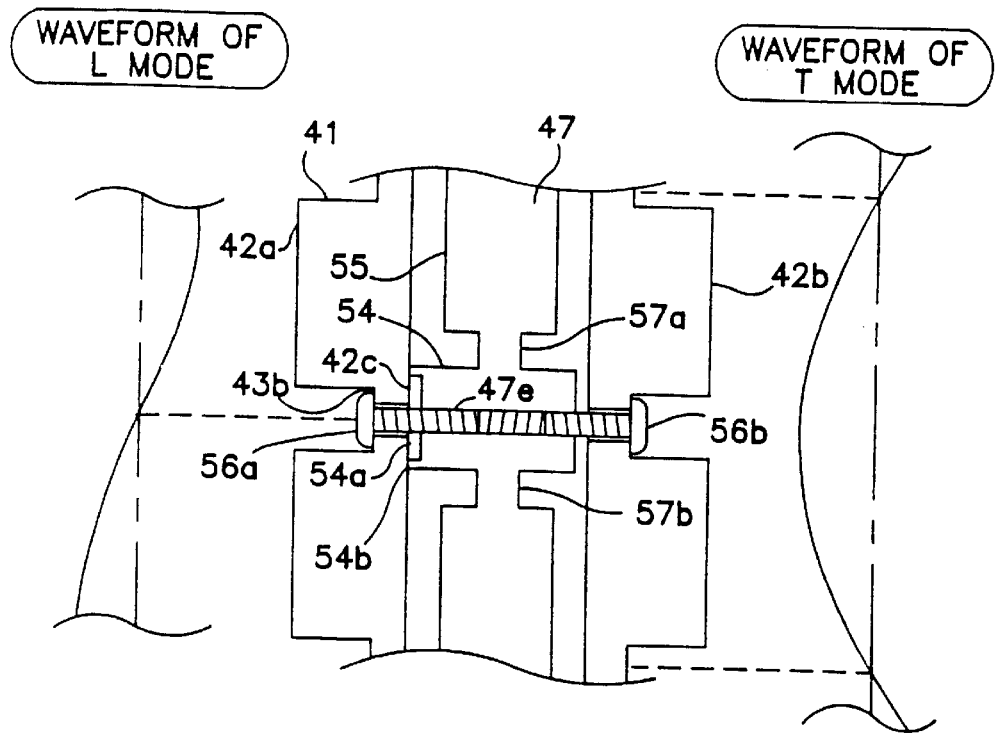
FIG. 11 is an enlarged sectional view showing the fixing situation of the vibrator and fixed shaft of FIG. 9.

FIG. 11 is an enlarged cross sectional diagram showing the fixing state of the elastic bodies 42a, 42b and the fixed shaft 47 in FIG. 9.

As shown in FIG. 9, in this embodiment also, similarly to the first embodiment and the second embodiment, a portion of the inner circumferential surface in the vicinity of the nodal position of the longitudinal vibration (vicinity of the antinodal position of the torsional vibration) arising in the elastic bodies 42a, 42b, is set up as a mounting standard surface 42c.

On the other hand, in a portion of the fixed shaft 47 including the same range as the mounting standard surface 42c with respect to the direction of the fixed shaft, a large diameter portion 54 is formed in this portion, and has a curved surface of the same radius of curvature as the radius of curvature of the mounting standard surface 42c. The large diameter portion 54, via this local surface, comes into contact with the mounting standard surface 42c. The small diameter portion 55 outside the large diameter portion 54 of the fixed shaft 47 does not come into contact with the inner circumferential surface of the elastic bodies 42a, 42b. Namely, in this mode of embodiment also, the large diameter portion 54 operates as a contact portion with the elastic bodies 42a, 42b, and the small diameter portion 55 acts as a non-contact portion.

Furthermore, a countersunk hole 54a is formed in the contact surface of the mounting standard surface 42c of the large diameter portion 54, forming a noncontact portion with the mounting standard surface 42c. Namely, in this embodiment, by the local surface of the large diameter portion 54b coming in contact with the mounting standard surface 42c, and by the annular local surface 54b, except for the range of formation of the countersunk hole 54a within the local surface of the large diameter portion 54, which is in contact with the mounting standard surface 42c, the large diameter portion 54 comes into contact with the elastic bodies 42a, 42b.

In the state in which the mounting standard surface 42c of the elastic body 42a has caused the contact surface of the large diameter portion 54, which was formed on the fixed shaft 47, to closely adhere, fixing bolts 56a, 56b are screwed into threaded holes which were formed in the large diameter portion 54. The elastic bodies 42a, 42b are fixed and supported by the fixed shaft 47. Moreover, the fixing bolt 56a is screwed into the large diameter portion 54 in a state passing through the countersunk hole 54a.

In this manner, in this embodiment, the countersunk hole 54a is disposed in the large diameter portion 54 in order for the contact surface of the elastic bodies 42a, 42b and the fixed shaft 47 to be kept to a minimum. By proceeding in this manner, because the contact surface of the large diameter portion which contacts the mounting standard portion 42c formed in the elastic body inner circumferential surface can be made small, the position setting accuracy is not caused to decrease, and the surface area in contact with the elastic body 41 can be kept a small as possible.

In other words, because the registration of two adjacent rigid bodies is basically set by three-point contact, the contact surface area for registration does not in its entirety confer registration. In this embodiment, the countersunk hole 54a is one which forms this kind of portion allowing for registration.

Moreover, in this embodiment, because the elastic body 41 is fixed with respect to the fixed shaft 47 in the vicinity of an antinode position of the torsional vibration, there is a possibility that the movement attenuation of the torsional vibration will increase. Consequently, in order to make the attenuation of the torsional vibration as small as possible, at both ends of the large diameter portion 54 in the axial direction, forming very small diameter portions 57a, 57b, a reduction of rigidity is brought about in relation to the displacement direction of the torsional vibration arising in the elastic body 41.

In this embodiment, by causing the large diameter portion 54 provided with the countersunk hole 54a to be contacted in a nodal position with respect to the longitudinal vibration, and by forming the very small diameter portions 57a, 57b in the fixed shaft 47 with respect to the torsional vibration, while reducing the support losses with respect to all the vibrations, the elastic bodies 42a, 42b can be arranged in accurate positioning with respect to the fixed shaft 47.

In particular, with respect to the driving frequency of the moving element, the frequency becomes very low of the vibration mode, which is set by the vibrating system of the vibrator 41 as one attenuating body and in addition the torsional rigidity of the very small diameter portions 57a, 57b as the torsional rigidity at this time, which is desirable from the standpoint of reduction of support losses, and of vibration insulation to the exterior. That is, in the case of the condition described above, the vibration frequency of the vibration arising in the elastic body 41 with respect to the frequency of the vibration mode group set by the vibrating system of the vibrator 41 as one attenuating body, the torsional rigidity of the very small diameter portions 57a, 57b becomes the torsional rigidity at this time, because it is a very high frequency. The latter vibrating system cannot follow its rate of vibration. Accordingly, the so-called vibration insulation arises, the vibration of the elastic body 41 is screened off by the very small diameter portions 57a, 57b, and is hardly transmitted to the large diameter portion 55.

In FIG. 10(B), the drive circuit 60 is constituted by the oscillator 61 which generates a drive signal (not shown in the drawing), a phase shifter 62 which divides the drive signal into a signal of phase shift $(1/4)\lambda$ ($\lambda$=wavelength), a T amplifier 63 which amplifies the drive signal input to the piezoelectric element 44a for torsional vibration use, and an L amplifier 64 which amplifies the drive signal input to the piezoelectric element 44b for longitudinal vibration use.

By such a constitution, the oscillator 61 generates a drive signal, which is divided by the phase shifter 62 into two signals which have a phase difference of $(1/4)\lambda$, with the two signals being amplified by the respective T amplifier 63 and L amplifier 64. The drive signal amplified by the T amplifier 63 is input to the piezoelectric element 44a for torsional vibration use, and the drive signal amplified by the L amplifier 64 is input to the piezoelectric element 44b for longitudinal vibration use.

Figure 12:
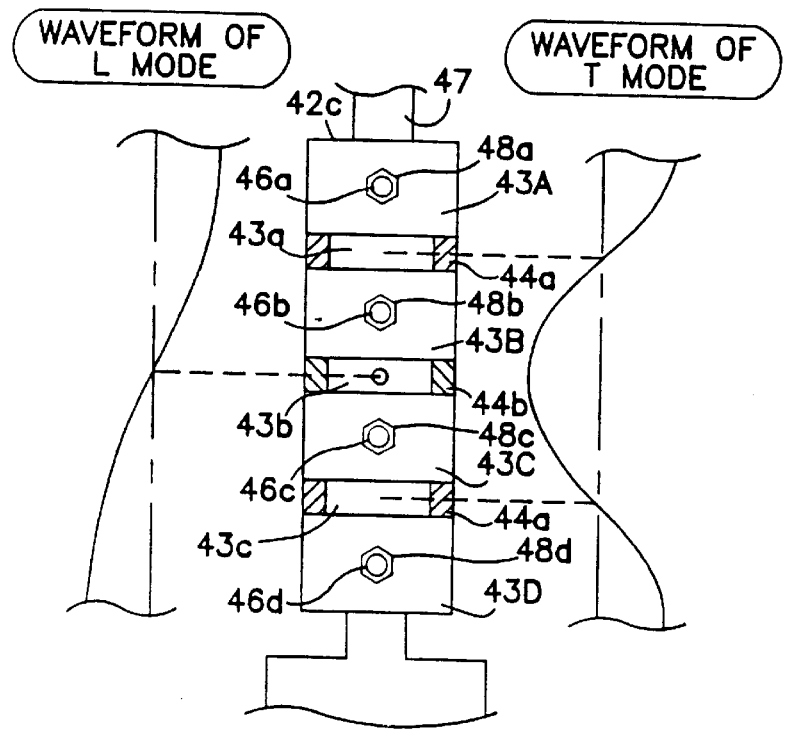
FIG. 12 is an illustrative diagram showing the first order longitudinal vibration and second order torsional vibration having antinodes and nodes arising in the vibrator to which drive signals are introduced.

By exciting the piezoelectric elements 44a, 44b by the drive signals input in the vibrator 41, a first order longitudinal vibration and a second order torsional vibration arise, having antinodes and nodes as shown in FIG. 12. Here, by fixing the phase shift of the periodic voltage impressed on the torsional vibration use piezoelectric element 44a and the longitudinal vibration use piezoelectric element 44b as a displacement of (1/4) λ, as shown in FIGS. 13(A)–13(H), elliptic motion arises in the drive surface 42c. Moreover, the change in the elliptic motion in the drive surface 42c as shown in FIGS. 13(A)–13(H), because it is similar to the change shown in FIG. 6, a description in relation to FIG. 13 will be omitted.

At this time, nodes of the torsional vibration arise at two places, the small diameter portions 43a, 43c which have weak torsional rigidity, and the drive surface becomes an antinode. On the other hand, the longitudinal vibration has a node close to the small diameter portion 42b, and the drive surface becomes an antinode. The moving element 49 pressed against this drive surface, receives driving force frictionally from the vibrator 41, and is driven.

Here, as shown in FIGS. 13(A)–13(H), the period of the torsional vibration and the period of the longitudinal vibration are displaced by the phase shift of (1/4) λ, and a point on the drive surface generates elliptic motion. When the drive frequency of this torsional vibration is made to about coincide with the resonant frequency of the torsional vibration, and in addition the drive frequency of the longitudinal vibration is made to about coincide with the resonant frequency of the longitudinal vibration, the resonating elliptic motion becomes enlarged.

Moreover, in this mode of embodiment, because the torsional resonant frequency and the longitudinal resonant frequency can be both set only in the vibrator 41, the form of the moving element 49 can be set comparatively freely. Because of this, it is necessary to make the transmission small of vibration from the vibrator 41 to the moving element 49, but, for example, using a sliding element 49b (for example, polyfuron and the like) of large vibration attenuation, and by using a moving element basic material 49a of large attenuation (for example, aluminum alloy and the like), a large vibration attenuation of the moving element 49 itself may be maintained.

Figure 14:
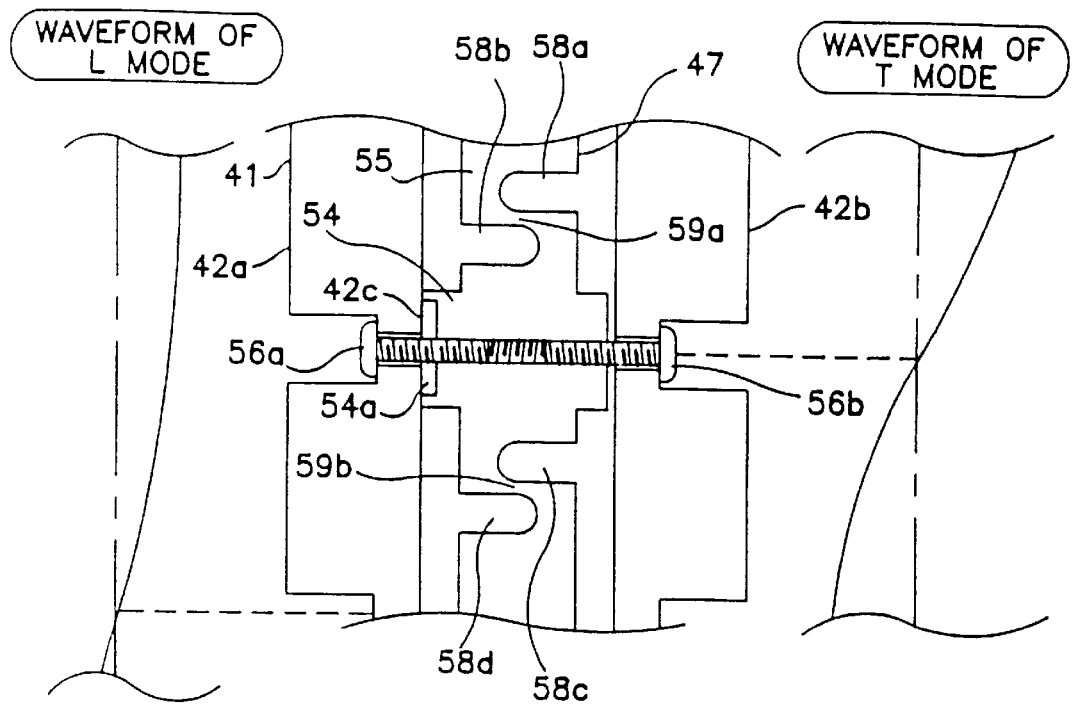
FIG. 14 is a cross sectional diagram which illustrates an ultrasonic actuator according to a fourth preferred embodiment of the present invention.

FIG. 14 is an enlarged cross section showing the state of fixation of the elastic bodies 42a, 42b and the fixed shaft 47 of a fourth preferred embodiment.

In this embodiment, with respect to the third embodiment shown in FIGS. 9–13, the state of fixing of the elastic bodies 42a, 42b and the fixed shaft 47 is changed, by fixation close to the antinode position of the torsional vibration (close to the antinode of the longitudinal vibration. Consequently, the description of this mode of embodiment will be described only as regards differences from the third embodiment, and by using the same symbols for the same components in the Figure, duplicate description will be suitably omitted.

In this embodiment, because the vibrational displacement direction of the longitudinal vibration arising in the vibrator 41 and the bending rigidity is made low in an approximately perpendicular direction to the longitudinal vibration, plural rigidity reducing holes 58a, 58b, 58c, 58d are formed at both ends in the axial direction of the fixed shaft in the large diameter portion 54. Each rigidity reducing hole 58a–58d is formed in a mutually parallel direction at right angles to the surface of the drawing.

By forming these rigidity reducing holes 58a–58d in the fixed shaft 47, the tensile rigidity is reduced between the pair of rigidity reducing holes 58a and 58b, and the pair of rigidity reducing holes 58c and 58d, by the action of the tensile rigidity reducing portions 59a, 59b. There is no restriction of the longitudinal vibrational displacement, and resonance is possible in the naturally close state. By this structure, it is possible to markedly reduce the support losses of the vibrator 41.

In particular, with respect to the drive frequency of the vibrator 41, the frequency of the vibration mode set by the vibrating system of the vibrator 41 as one attenuating body and in addition the torsional rigidity of the tensile rigidity reducing portions 59a, 59b as the torsional rigidity at this time is very low, is desirable from the standpoint of reduction of support losses and of vibration insulation to the exterior.

Figure 15:
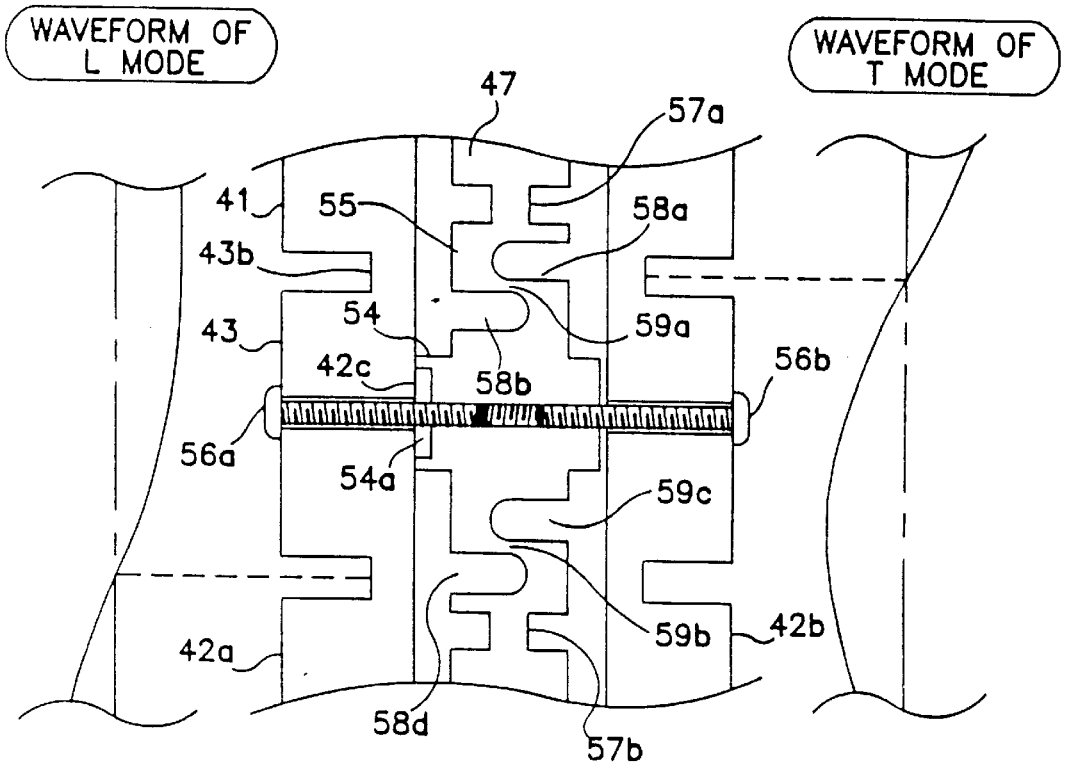
FIG. 15 is a cross sectional diagram which illustrates an ultrasonic actuator according to a fifth preferred embodiment of the present invention.
Figure 16:
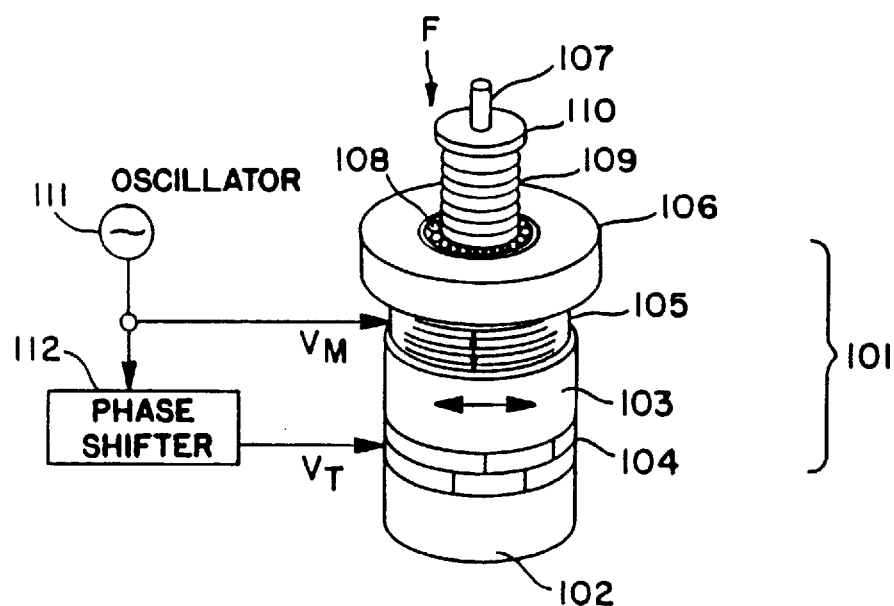
FIG. 16 is an oblique diagram showing a prior art example of a longitudinal-torsional vibration type of vibration actuator.
Figure 17:
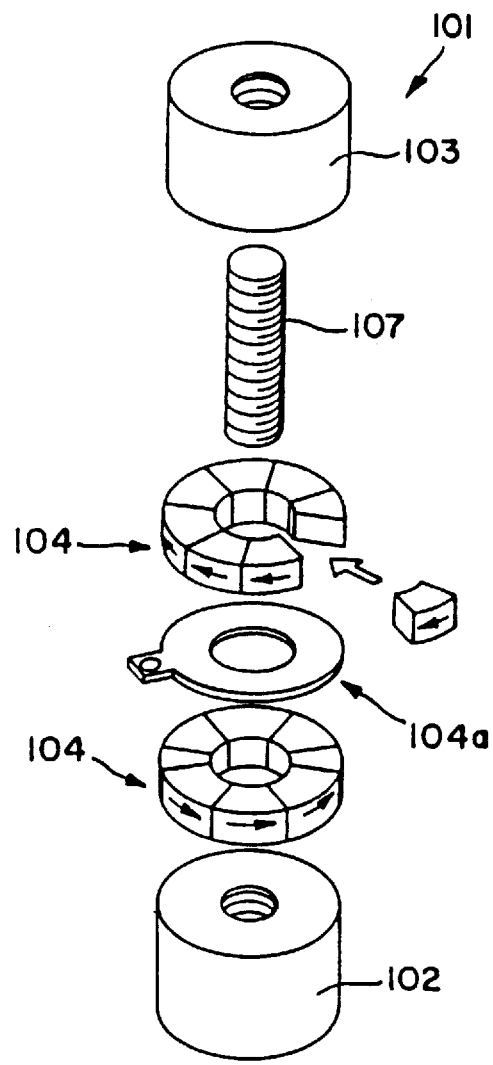
FIG. 17 is an oblique diagram showing an exploded view of the stator of a known longitudinal-torsional vibration type of vibration actuator.

FIG. 15 is an enlarged cross section showing the state of fixation of the elastic bodies 42a, 42b and the fixed shaft 47 of a fifth preferred embodiment.

In this embodiment, in outline, is a combination of the fixed shaft of the third embodiment shown in FIG. 11, and the fixed shaft of the fourth embodiment shown in FIG. 14.

Namely, this embodiment, with respect to the third embodiment shown in FIGS. 9–13 and the fourth embodiment shown in FIG. 14, has a fixation position of the elastic bodies 42a, 42b and the fixed shaft 47 that is changed, by fixing close to the antinode position of the longitudinal vibration and also close to the antinode position of the torsional vibration (large diameter portion 43C).

The fixing position of this embodiment, both outside a nodal position of the longitudinal vibration and a nodal position of the torsional vibration, are not preferred from the standpoint of eliminating vibrational attenuation. Consequently, in the vicinity of the large diameter portion 54 of the fixed shaft 47, suppressing the attenuation of the longitudinal vibration, rigidity reducing holes 58a–58d are formed, and in addition, suppressing attenuation of torsional vibration, very small diameter portions 57a, 57b are formed. This is effective in the case in which it is necessary to perform the support of the fixed shaft 47 in this position.

In each embodiment, vibrators are used in which first order torsional, first order longitudinal, or second order torsional, first order longitudinal, modes arise. The present invention is not limited to these, and vibrators in which m'th order torsional, n'th order longitudinal, modes arise can likewise be applied (m and n being integers).

Moreover, piezoelectric elements have been used as the electro-mechanical converters, but the present invention is not limited to this structure only, and the conversion of electrical energy to mechanical displacements (mechanical energy) is equally applicable. For example, magnetostrictive or electrostrictive elements can be used instead. Moreover, the form of the elastic body constituting the vibrator is not limited to a cylindrical tube. For example, a square column may be used.

Furthermore, in each embodiment, ultrasonic actuators whose vibrational frequency is ultrasonic have been used as examples of vibration actuators, but the present invention is not limited to the situation of such vibration actuators, and vibration actuators using other frequencies can equally be used.

In any of the preferred embodiments, the vibrator, which is an elastic body, is not in contact, over the whole region of the inner circumferential surface, with the fixed shaft. Because it is constituted such that only a portion of it contacts the fixed shaft, it is easy to perform accurate positioning. Moreover, by the reduction of the area of the contact portion, the support losses can be suppressed as much as possible, and accurate positioning can easily be performed, and in addition, the generation of noise during driving of the vibration actuator, and a reduction of the driving efficiency and driving force, can be mitigated.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A vibration actuator, comprising:

a rod shaped support member having an exterior surface;

an elastic body having an inner circumferential surface and being located on the exterior surface of the support member and which supports an electro-mechanical energy conversion element to convert electrical energy into mechanical energy and being excited by a drive signal, the electromechanical energy conversion element generating a drive force in a drive surface which is an end surface of the elastic body;

a relative motion member, disposed to be freely rotatable around the support member and compressively contacting the elastic body at the drive surface; and a fixed member which penetrates the support member and the elastic body, wherein the support member has a first side edge that contacts an inner circumferential surface of said elastic body, and a second side edge opposite the first side edge that does not contact the inner circumferential surface of said elastic body, and wherein a portion of the inner circumferential surface of the elastic body includes a mounting standard unit disposed to regulate the positional relationship of the elastic body and the support member.

2. A vibration actuator according to claim 1, wherein the support member, in relation to an axial direction, comprises a contact portion which comes into contact with the mounting standard unit, and a non-contact portion which is separated from the inner circumferential surface of the elastic body excluding the mounting standard unit.

3. A vibration actuator according to claim 2, wherein the contact portion is a large diameter portion, and the non-contact portion is a small diameter portion.

4. A vibration actuator according to claim 2, wherein the contact portion is formed to fit a portion of the internal surface of the elastic member.

5. A vibration actuator according to claim 3, wherein the contact portion is formed to fit a portion of the internal surface of the elastic member.

6. A vibration actuator according to claim 2, wherein the contact portion is disposed in a position which contacts a nodal portion of a torsional vibration or of a longitudinal vibration of the elastic member.

7. A vibration actuator according to claim 3, wherein the contact portion is disposed in a position which contacts a nodal portion of a torsional vibration or of a longitudinal vibration of the elastic member.

8. A vibration actuator according to claim 4, wherein the contact portion is disposed in a position which contacts a nodal portion of a torsional vibration or of a longitudinal vibration of the elastic member.

9. A vibration actuator according to claim 5, wherein the contact portion is disposed in a position which contacts a nodal portion of a torsional vibration or of a longitudinal vibration of the elastic member.

10. A vibration actuator according to claim 4, wherein on a portion of the contact portion, a non-contact portion is formed which does not contact the mounting standard unit.

11. A vibration actuator according to claim 5, wherein on a portion of the contact portion, a non-contact portion is formed which does not contact the mounting standard unit.

12. A vibration actuator according to claim 10, wherein the non-contact portion is formed by a counter sink hole disposed in the contact portion.

13. A vibration actuator according to claim 11, wherein the non-contact portion is formed by a counter sink hole disposed in the contact portion.

14. A vibration actuator according to claim 2, wherein in the elastic body, an abutment member acts as said first edge and is disposed to cause the contact portion of the support member to come into contact towards the mounting standard unit of the elastic body.

15. A vibration actuator according to claim 14, wherein the abutment member is fixed in the contact portion of the support member.

16. A vibration actuator according to claim 15, wherein the abutment member perforates the non-contact portion of the contact portion.

17. A vibration actuator according to claim 1, wherein the fixed member is disposed at a node of one of a torsional vibration and a longitudinal vibration of the elastic body.

* * * * *